US008531607B2

(12) United States Patent
Han et al.

(10) Patent No.: US 8,531,607 B2
(45) Date of Patent: Sep. 10, 2013

(54) APPARATUS FOR TRANSMITTING BROADCAST SIGNAL, METHOD THEREOF, METHOD OF PRODUCING BROADCAST SIGNAL AND APPARATUS FOR RECEIVING BROADCAST SIGNAL

(75) Inventors: Seong Cheol Han, Uijeongbu-Si (KR); Seung Heon Yang, Seoul (KR); Jong Keun Youn, Gunpo-Si (KR); Byoung Ho Choi, Goyang-Si (KR); Jae Do Kwak, Seoul (KR); Jin Tae Kim, Gunsan-Si (KR); Mun Ho Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1090 days.

(21) Appl. No.: 11/735,360

(22) Filed: Apr. 13, 2007

(65) Prior Publication Data

US 2008/0074554 A1 Mar. 27, 2008

(30) Foreign Application Priority Data

Apr. 21, 2006 (KR) ........................ 10-2006-0036347

(51) Int. Cl.

*H04N 9/74* (2006.01)
*H04N 15/00* (2006.01)
*H04N 13/00* (2006.01)
*H04N 5/38* (2006.01)

(52) U.S. Cl.

USPC .............................. 348/578; 348/43; 348/723

(58) Field of Classification Search

None
See application file for complete search history.

(56) References Cited

U.S. PATENT DOCUMENTS

| | | | | |
|---|---|---|---|---|
| 5,537,153 | A * | 7/1996 | Shigihara | 725/56 |
| 5,610,653 | A | 3/1997 | Abecassis | |
| 6,167,136 | A * | 12/2000 | Chou | 380/201 |
| 6,549,650 | B1 * | 4/2003 | Ishikawa et al. | 382/154 |
| 6,819,395 | B2 * | 11/2004 | Werner | 352/40 |
| 6,986,159 | B1 * | 1/2006 | Shimoji et al. | 725/142 |
| 7,293,101 | B1 * | 11/2007 | Schaefer et al. | 709/232 |
| 2001/0037507 | A1 * | 11/2001 | Mori | 725/97 |
| 2001/0042114 | A1 * | 11/2001 | Agraharam et al. | 709/223 |
| 2002/0067436 | A1 | 6/2002 | Shirahama et al. | |
| 2003/0067560 | A1 * | 4/2003 | Suzuki | 348/578 |
| 2004/0027452 | A1 | 2/2004 | Yun et al. | |
| 2004/0047595 | A1 * | 3/2004 | Matsuura et al. | 386/67 |
| 2004/0244037 | A1 | 12/2004 | Yamaguchi et al. | |
| 2005/0196143 | A1 | 9/2005 | Kato et al. | |
| 2005/0243190 | A1 | 11/2005 | Ogikubo | |
| 2005/0285997 | A1 | 12/2005 | Koyama et al. | |
| 2006/0087499 | A1 * | 4/2006 | Chen et al. | 345/204 |

FOREIGN PATENT DOCUMENTS

| | | | |
|---|---|---|---|
| CN | 1324181 | A | 2/2005 |
| CN | 1685277 | A | 4/2008 |
| CN | 1685723 | A | 4/2008 |
| EP | 0967747 | * | 12/1999 |
| EP | 1460849 | A1 | 9/2004 |
| EP | 1503589 | A1 | 2/2005 |

(Continued)

*Primary Examiner* — Jefferey Harold
*Assistant Examiner* — Michael Teitelbaum
(74) *Attorney, Agent, or Firm* — Birch, Stewart, Kolasch & Birch, LLP

(57) ABSTRACT

An apparatus and method for transmitting a broadcast signal, an apparatus and method of reproducing a broadcast signal, and a broadcast signal data structure, are discussed. According to an embodiment, the method of transmitting the broadcast signal includes generating image modification control information for at least one image; and transmitting the image and the image modification control information as broadcast data.

12 Claims, 11 Drawing Sheets

(56) References Cited

FOREIGN PATENT DOCUMENTS

| | | | | |
|---|---|---|---|---|
| EP | 1628490 | A1 | | 2/2006 |
| EP | 1657835 | A1 | | 5/2006 |
| JP | 3-289280 | A | | 12/1991 |
| JP | 2000-330505 | A | | 11/2000 |
| JP | 2001-326875 | A | | 11/2001 |
| JP | 2003-512781 | A | | 4/2003 |
| JP | 2004-180290 | A | | 6/2004 |
| JP | 2005-6114 | A | | 1/2005 |
| JP | 2005-94168 | A | | 4/2005 |
| WO | 2005/043783 | A1 | | 5/2005 |
| WO | WO2005/057932 | | * | 6/2005 |
| WO | 2005/069621 | A1 | | 7/2005 |

* cited by examiner

FIG. 3

| $b_7 b_4$ | Description |
|---|---|
| 0 0 0 0 | complete EBU Latin based repertoire [25] |
| 0 0 0 1 | EBU Latin based common core, Cyrillic, Greek [25] |
| 0 0 1 0 | EBU Latin based core,Arabic,Hebrew,Cyrillic,Greek [25] |
| 0 0 1 1 | ISO Latin Alphabet No 2 (see ISO-8859 Part 2 [7]) |
| 0 1 0 0 | ISO Latin Alphabet No 1 (see ISO-8859 Part 1 [6]) |

< table 1 >

| Parameter Id $b_5$ $b_0$ | Parameter | Definition | Possible occurrences | Usage mandatory for content provider | Support mandatory for MOT decoders |
|---|---|---|---|---|---|
| 00 0000 | reserved for MOT protocol extensions | | | | |
| 00 0001 | PermitOUtdatedVersions | 6.2.3.1.4 | only once | no | no |
| 00 0010<br>00 0011<br>00 0100 | reserved for MOT protocol extensions | | | | |
| | | | | | |
| 00 1010 | Priority | 6.2.3.1.4 | only once | no | no |
| 00 1011 | Label (user application specific parameter) | see [6] | only once | no | no |
| 00 1100 | ContentName | 6.2.2.1.1 | only once | yes | yes |
| 00 1101 | UniquebodyVersion | 6.2.2.1.3 | only once | no | no |

< table 2 > 20

FIG. 6

| <table XX> Image transition effect table | | |
|---|---|---|
| Decimal Number | Require field(s)-2byte | Action type |
| 0 | | Non-fixed item |
| 1 | | Fade in |
| 2 | | Fade out |
| 3 | | Zoom in |
| 4 | | Zoom out |
| 5 | | Wipe |
| 6 | | Dissolve in |
| 7 | | Split |
| 8 | | Thread |
| 9 | | Spiral in |
| 10 | | Spiral out |
| 11 | | Light speed |
| 12 | | Fold |
| 13 | | Float |
| 14 | | Sliding |
| 15 | | Compress |
| 16 | | Center Revolve |
| 17 | | Fly in |
| .. | | ... |
| .. | | .. |
| 99 | | Random Effects |

(a-1) (a-2) (a-3)

(b-1) (b-2) (b-3)

APPARATUS FOR TRANSMITTING BROADCAST SIGNAL, METHOD THEREOF, METHOD OF PRODUCING BROADCAST SIGNAL AND APPARATUS FOR RECEIVING BROADCAST SIGNAL

This application claims the priority benefit of the Korean Patent Application No. 10-2006-0036347, filed on Apr. 21, 2006, which is hereby incorporated by reference as if fully set forth herein.

BACKGROUND OF THE INVENTION

1. Field of the Invention

The present invention relates to an apparatus and method for transmitting a broadcast signal, an apparatus and method for reproducing a broadcast signal, and a broadcast signal data structure.

2. Discussion of the Related Art

Generally, as analog broadcasting is replaced by digital broadcasting to transmit digital signals, the digital broadcasting is able to transmit additional image information, text and the like as well as images for a pure broadcast.

Yet, since the transmission bandwidth for a digital broadcast system or a digital communication system is limited, an object to be transmitted has a limitation in size.

In a broadcast system according to a related art, in case that a broadcast transmitting end transmits a series of images with a predetermined time interval, a broadcast receiving end is able to play back the images according to the same time interval and the same transmission sequence from a timing point delayed from the transmission timing point.

However, if a broadcast or communication system having a narrow bandwidth reproduces a transmitted object consuming a large bandwidth, a playback speed of the reproduced object is not equal to the transmission speed of the object. As a result, dynamism of the reproduced object is lowered.

Further, even if the broadcast receiving end is able to reproduce objects transmitted from the broadcast transmitting end, the broadcast receiving end is subject to the transmission speed or sequence of the objects transmitted by the broadcast transmitting end when reproducing the objects and thus there is a limitation on the types and configurations of contents that can be transmitted for an effective display.

For instance, the broadcast transmitting end may be able to transmit a 3-dimensional image or broadcast signals having various image configurations to attract the interest of the viewers at the receivers. However, according to the related art, this process is carried out in the same manner for all contents. Also, it is the broadcast transmitting end that generates the 3-dimensional images and broadcast signals having various image configurations and effects. As such, a heavy load of configuring to generate and transmit these images is put on the broadcast transmitting end, and the bandwidth problems are present at the transmitting end since these image need large bandwidths for transmission.

In addition, in the related art broadcast receiving apparatus and method, the broadcast receiving end has a problem in receiving such objects, transmitted by the broadcast transmitting end and reproducing the objects itself. For instance, if the transmission speed of the broadcast signal is slow or the bandwidth is limited, the broadcast receiving end is unable to properly receive, reproduce and display the objects, e.g., 3-dimensional images or images having special effects.

SUMMARY OF THE INVENTION

Accordingly, the present invention is directed to an apparatus and method for transmitting a broadcast signal, an apparatus and method for reproducing a broadcast signal, and a broadcast signal data structure that substantially obviate one or more problems due to limitations and disadvantages of the related art.

An object of the present invention is to provide an apparatus and method for transmitting a broadcast signal, an apparatus and method for reproducing a broadcast signal, and a broadcast signal data structure, by which convenience can be provided to both a broadcast signal transmitting side and a broadcast signal receiving side.

Another object of the present invention is to provide a method of transmitting a broadcast signal and a method of reproducing a broadcast signal, by which a type of a transmitted broadcast signal can be variously varied.

Another object of the present invention is to provide an apparatus and method for generating and transmitting a broadcast signal, and an apparatus and method for receiving and reproducing a broadcast signal, by which a transmission image can be dynamically changed for a playback.

A further object of the present invention is to provide an apparatus and method for transmitting a broadcast signal, an apparatus and method for reproducing a broadcast signal, and a broadcast signal data structure, by which a transmitted broadcast signal can be 3-dimensionally reproduced and/or can be reproduced with special effects and configurations.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a broadcast signal according to and aspect of the present invention includes the steps of preparing an image, generating scene change control information for the image, converting the prepared image and the scene change control information for the image to broadcast data, and transmitting the broadcast data.

In another aspect of the present invention, in a broadcast receiver receiving broadcast data including an image and scene change control information for the image, a method of reproducing a broadcast signal according to another aspect of the present invention includes the steps of receiving the broadcast data, decoding the received broadcast data, obtaining the image and the scene change control information for the image from the decoded broadcast data, storing the obtained image and the obtained scene change control information for the image, and changing to display the stored image based on the obtained scene change control information.

In another aspect of the present invention, an apparatus for transmitting a broadcast signal according to another aspect of the present invention includes an image storing unit storing at least one image, an image reproduction control information generating unit generating scene change control information for the stored image, a broadcast signal converting unit converting the stored image and the generated scene change control information to broadcast data, and a transmitting unit transmitting the broadcast data.

In another aspect of the present invention, an apparatus for receiving a broadcast signal according to another aspect of the present invention includes a communicating unit receiving to decode broadcast data including an image and scene change control information for the image, a memory unit storing the decoded image and the scene change control information for the image, a control unit changing the stored image based on the scene change control information, and a display unit outputting the changed image.

In another aspect of the present invention, a method of transmitting a broadcast signal according to another aspect of the present invention includes the steps of generating a broadcast object and reproduction scene change control information for the broadcast object, converting the broadcast object and the reproduction scene change control information for the broadcast object to broadcast data, and transmitting the broadcast data.

In another aspect of the present invention, a method of reproducing a broadcast signal according to another aspect of the present invention includes the steps of receiving broadcast data including a broadcast object and reproduction scene change control information for the broadcast object, obtaining the reproduction scene change control information for the broadcast object by decoding the received broadcast data, and changing to display the broadcast object based on the obtained reproduction scene change control information.

In a further aspect of the present invention, a data structure of a broadcast signal including an image, is embodied on a computer-readable medium and includes an image switching field including scene change control information for the image.

According to still another aspect of the present invention, there is provided a method of transmitting a broadcast signal, comprising: generating image modification control information for at least one image; and transmitting the image and the image modification control information as broadcast data.

According to still another aspect of the present invention, there is provided, in a broadcast receiver configured to receive broadcast data including an image and image modification control information for the image, a method of reproducing a broadcast signal, comprising: receiving the broadcast data including the image and the image modification control information; decoding the received Broadcast data; obtaining the image and the image and the image modification control information for the image from the decoded broadcast data; storing the obtained image and the obtained image modification control information; and modifying the stored image based on the obtained image modification control information, for displaying.

According to another aspect of the present invention, there is provided an apparatus for transmitting a broadcast signal, comprising: an image reproduction control information generating unit configured to generate image modification control information for an image; a broadcast signal converting unit configured to convert the image and the generated image modification control information to broadcast data; and a transmitting unit configured to transmit the broadcast data.

According to another aspect of the present invention, there is provided an apparatus for reproducing a broadcast signal, comprising: a decoder configured to decode received broadcast data including an image and image modification control information for the image; a memory unit configured to store the image and the image modification control information obtained from the decoder; a control unit configured to change the stored image based on the image modification control information; and a display unit configured to output the changed image.

According to another aspect of the present invention, there is provided a method of transmitting a broadcast signal using a transmitting apparatus, comprising: generating, by the transmitting apparatus, a broadcast object and scene change control information for the broadcast object; and transmitting, by the transmitting apparatus, the broadcast object and the scene change control information as broadcast data.

According to another aspect of the present invention, there is provided a method of reproducing a broadcast signal using a receiving apparatus, comprising: receiving, by the receiving apparatus, broadcast data including a broadcast object and scene change control information for the broadcast object; obtaining, by the receiving apparatus, the broadcast object and the scene change control information from the received broadcast data; modifying, by the receiving apparatus, the broadcast object based on the scene change control information for the broadcast object; and out putting, by the receiving apparatus, the modified broadcast object.

According to another aspect of the present invention, there is provided a data structure embodied on at least one computer-readable medium, for transmitting a broadcast object, the data structure comprising: a first field to store header information associated with the broadcast object; and at least one second field to store image modification control information for the broadcast object, wherein the image modification control information includes scene change control information for the broadcast object, and/or internal change information for changing internals between broadcast objects.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 is an exemplary diagram of a multimedia object transfer protocol among various broadcasting and communication transfer protocols according to the present invention;

FIG. 6 is an image transition effect table (look up table) based on image scene change control information according to an embodiment of the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
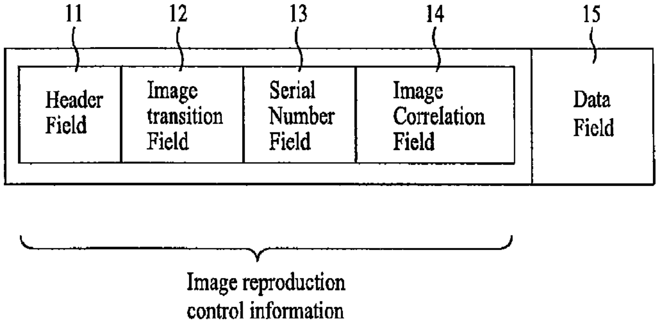
FIG. 1 is a block diagram of a data structure of a broadcast signal according to an embodiment of the present invention.

FIG. 1 is a block diagram of a data structure of a broadcast signal according to an embodiment of the present invention.

Referring to FIG. 1, in case of transmitting a broadcast signal, it is able to insert reproduction information for reproducing broadcast objects in a broadcast signal. In the present invention, examples of the broadcast objects included in the broadcast signal include, but are not limited to, image information or images, text information or texts, audio information, advertisements, graphics, icons, etc. In the description of the present specification, in case that the broadcast objects included in the broadcast signal are reproduced, reproduction principles of the broadcast objects are defined. And, information for controlling reproduction of the broadcast objects, which can be parsed from the broadcast signal, is referred to as reproduction control information. For instance, if a broadcast object is an image, then the reproduction control information can be referred to as image reproduction control information. The reproduction control information can include image (or broadcast object) modification control information, serial number information, image correlation information, etc. Header information can also be included in the reproduction control information. The image (or broadcast object) modification information for the image, and/or interval change information for changing intervals between images. The modification control information preferably pertains to changing at least one of the following: a form, a color, a brightness, an opacity, a motion and a dimension of the image.

In case of transmitting the broadcast objects to a receiver side, a broadcast signal transmitting apparatus is able to transmit reproduction control information for the broadcast objects together with the broadcast objects.

So, it is unnecessary for the broadcast signal transmitting apparatus to variously change broadcast objects before the transmission. And, the broadcast signal transmitting apparatus enables a broadcast signal receiving apparatus to reproduce the received broadcast objects variously with reference to the received reproduction control information.

On the other hand, in case of decoding the received broadcast signal including the broadcast objects and the reproduction control information (e.g., associated with the broadcast objects), the broadcast signal receiving apparatus is able to reproduce the broadcast objects into the transformed form of the received image or others according to the reproduction principle obtained from modification control information or interval change information contained in the reproduction control information.

FIG. 1 shows an example of a data structure of a broadcast signal, which can be generated and transmitted by a transmitter at a transmitting side, according to an embodiment of the present invention. Such a broadcast signal can then be received by a receiver at a receiving side. In this example, a broadcast object is an image, but this structure is equally applicable to other examples of broadcast objects.

Referring to FIG. 1, in a broadcast signal to be transmitted from the transmitting side, a plurality of fields 11-14 contain image reproduction control information therein, and a data field 15 contains a broadcast object (actual content to be broadcast such as a program) to be displayed such as image data. The order of these fields can vary.

The header field 11 contains header information associated with the data contained in the data field 15. The image transition field (or image modification field) 12 includes scene change control information of an image to be displayed using the image data contained in the data field 15. The scene change control information of the image is control information to change or modify as aspect or scene of the image, e.g., a form, color, brightness, opacity, motion, dimension and the like of the image to be displayed using the image data contained in the data field 15.

The serial number field 13 indicates a serial number of an image belonging to an image group that includes the transmitted image or a serial number among at least one or more image groups.

And, the image correlation field 14 includes correlation information which can be discriminated per structure between the transmitted images.

Figure 2:
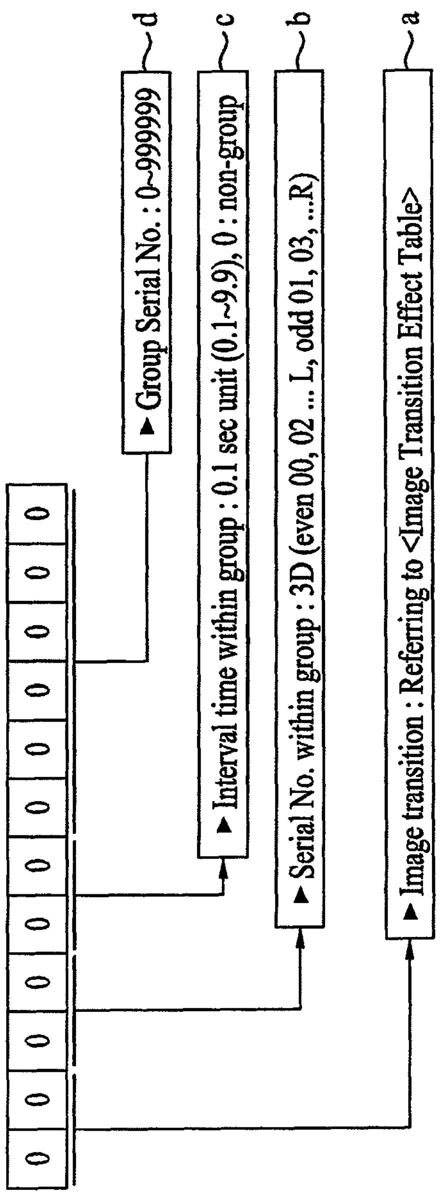
FIG. 2 is an exemplary diagram of image reproduction control information field in the data structure of FIG. 1 according to an embodiment of the present invention.

FIG. 2 is an exemplary diagram of image reproduction control information field(s) in a data structure of a broadcast signal according to an embodiment of the present invention. The area (a)-(d) shown in FIG. 2 can correspond to the fields 12 and 13 of FIG. 1. For instance, information in the area (a) and/or (c) can be viewed as an example of information (image modification control information) contained in the image transition field 12, and information contained in the areas (b) and (d) can be viewed as an example of information contained in the serial number field 13 of FIG. 1. The order of these areas can vary.

Referring to FIG. 2, the image transition effect area (a) includes image scene change control information. For instance, the image transition area (a) provides information for changing a form, color, brightness, opacity, motion, dimension and the like of an image transmitted based on an 'Image Transition Effect Table' or the like. By referring to the 'Image Transition Effect Table' in view of the information contained in the area (a), the receiving apparatus can know how to modify an aspect or scene of an image to be displayed. The 'Image Transition Effect Table' or the like can be stored in a broadcast signal receiving apparatus such as a mobile terminal or communication terminal.

The broadcast signal data structure according to the present invention can further include a field (e.g., the header field 11) including information indication a count of images of one group in case of having an image data field, the area (b) for storing information indicating a serial number within each group, the area (c) for storing information indicating a reproduction interval between the groups, and the area (d) for storing information indicating a serial number of each group.

The data structure according to the present invention is usable for a broadcast system configured to transmit broadcast signals or a communication system. The data structure according to the present invention can be embodied on at least one computer-readable medium or device such as disks, internal storages, memory sticks, etc. The broadcast or communication system uses various protocols capable of transmitting images. And, it is able to prepare the data field, as shown in FIGS. 1 and/or 2, in a reserved area of one of the protocols. And, it is able to transmit the reproduction control information for a broadcast signal using the data structure of the present invention.

A broadcast signal transmitting method and a broadcast signal reproducing method according to an embodiment of the present invention are explained in detail with reference to a multimedia object transfer (MOT), as an example, follows.

FIG. 3 is an exemplary diagram of a multimedia object transfer (MOT) protocol among various broadcasting and communication transfer protocols according to the present invention.

Referring to FIG. 3, Table 1 and Table 2 show a multimedia object transfer (MOT) protocol among various broadcasting and communication transfer protocols.

An example of transmitting reproduction control information using the MOT protocol is explained as follows according to an embodiment of the present invention. However, the reproduction control information or information contained in the image transition field 12 may be transmitted by using other protocols.

First of all, Table 2 partially shows a data field of DAB (multimedia audio broadcasting) MOT protocol of EN 301 234 V2.1.1. And, the data structure (e.g., fields 11-14 of FIG. 1) according to the present invention can be defined and provided in a reserved area of the MOT protocol.

For the extensibility of broadcast signal transmitting and reproducing methods according to the present invention, it is preferable that the data structure is defined at a data field having a variable length in the reserved area of the MOT protocol.

For instance, in Table 2, it can be understood that the data structure (e.g., fields 11-14 of FIG. 1) according to the present invention can be inserted in a content Name field 20 having a variable length. And, Table 1 indicates that the Content Name can be filled with data of Arabian numerals as a characteristic indicator.

So, if the reproduction control information is transmitted by inserting, e.g., values contained in the area (a) and/or (c) shown in FIG. 2 into the Content Name field 20 shown in Table 2, the receiving apparatus is able to reproduce a broadcast object (e.g., image) according to the received reproduction control information.

As mentioned in the foregoing description, the data structure of the present invention can be transmitted from a transmitting side to a receiving side using other broadcast or communication transfer protocols as well as the MOT protocol.

Figure 4:
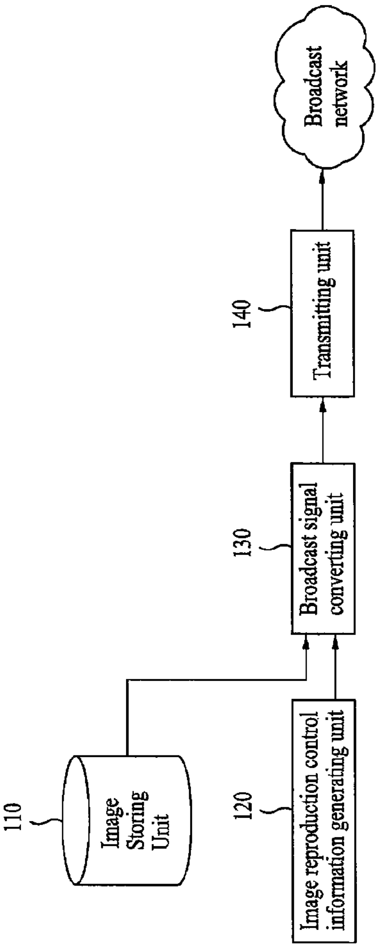
FIG. 4 is a block diagram of an apparatus for transmitting a broadcast signal according to one embodiment of the present invention.

FIG. 4 is a block diagram of an apparatus for transmitting a broadcast signal according to one embodiment of the present invention.

Referring to FIG. 4, the apparatus for transmitting a broadcast signal according to one embodiment of the present invention includes an image storing unit (or broadcast object storing unit) 110, an image reproduction control information generating unit (or broadcast object reproduction control information generating unit) 120, a broadcast signal converting unit 130 and a transmitting unit 140. The apparatus may include other components known in the art. All the components of the apparatus are operatively coupled and configured.

An operation of the broadcast signal transmitting apparatus according to one embodiment of the present invention is explained with reference to FIG. 4 as follows.

First of all, the image reproduction control information generating unit 120 is able to generate information for a reproduction principle/operation so that if a transmitted image can be properly reproduced by a broadcast signal receiving apparatus. And, the image reproduction control information generating unit 120 generates reproduction control information (e.g. information to be stored in the fields 11-14 of FIG. 1, or information as shown in FIG. 1), which includes scene change control information and/or interval change information for the image to be displayed according to the present invention. A receiving end receives this information and the image data, changes the image based on the scene change control information or interval change information, and displays the changed image.

The image storing unit 120 stores therein images broadcast objects to be transmitted. For instance, the image storing unit 110 receives an image (image data) externally generated, stores the received image and then outputs the stored image to the broadcast signal converting unit 130. Also, the image storing unit 110 can generate an image to be transmitted, temporarily store the generated image and then output the temporarily stored image to the converting unit 130.

The broadcast signal converting unit 130 converts the image data outputted by the image storing unit 110 and the image reproduction control information outputted by the image reproduction control information generating unit 120, into broadcast data. For instance, the broadcast signal converting unit 130 places the data output from the image storing unit 110 and the image reproduction control information generating unit 120 into the data structure a shown in FIGS. 1 and 2. The broadcast signal converting unit 130 packetizes the generated broadcast data according to a broadcast signal transfer principle and then outputs the packetized data.

The transmitting unit 140 transmits the broadcast data generated by the broadcast signal converting unit 130 via a broadcasting network.

Hence, the broadcast signal transmitting apparatus according to the present invention need not transform or modify images to be transmitted. For instance, in the related art, the broadcasting signal transmitting apparatus transformed a scene or aspect of an image for a desired effect, and then transmitted the transformed image, so the receiving apparatus merely needed to display the received transformed image. Instead, the broadcast signal transmitting apparatus of the present invention sends the image reproduction control information along with the image data, and now enables a broadcast signal receiving apparatus to dynamically modify and reproduce modified images using the reproduction control information associated with the images. As a result, the bandwidth limitations and other disadvantages associated with the related art are addressed by the present invention.

Figure 5A:
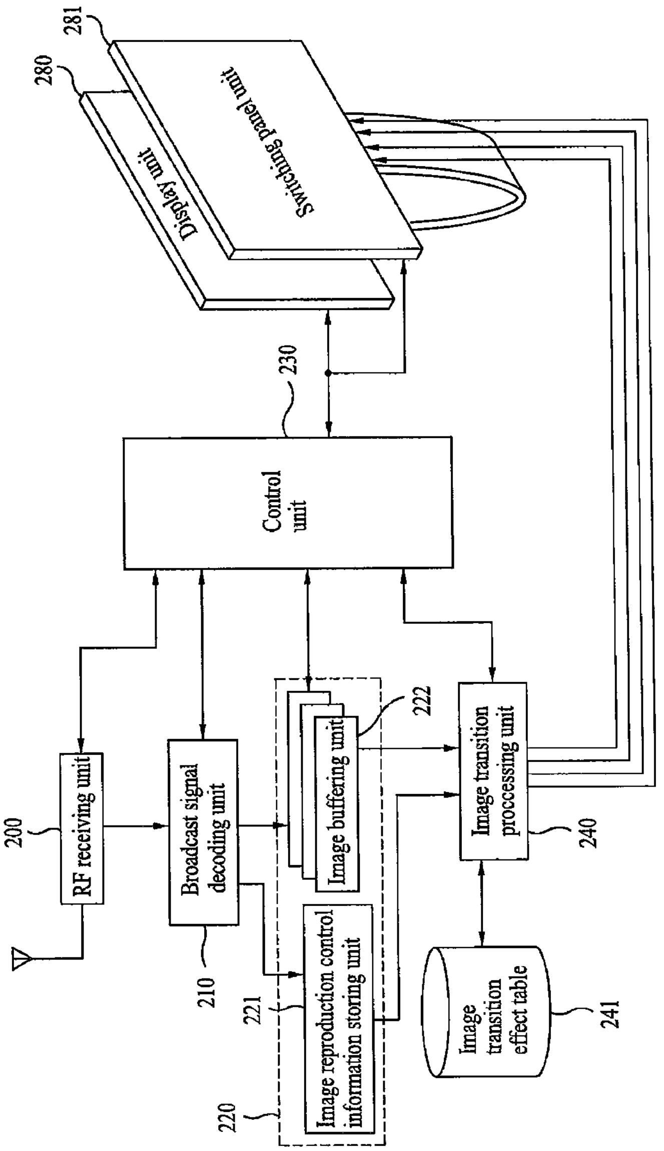
FIG. 5A is a block diagram of an apparatus for receiving a broadcast signal according to one embodiment of the present invention.

FIG. 5A is a block diagram of an apparatus for receiving a broadcast signal according to one embodiment of the present invention. The apparatus may include other components known in the art, which are not shown. All the components of the apparatus are operatively coupled and configured.

Referring to FIG. 5A, in the apparatus for receiving a broadcast signal according to one embodiment of the present invention, an RF receiving unit 200 receives a broadcast signal (e.g., the broadcast signal transmitted from the transmitting unit 140 through the broadcast network), demodulates the received broadcast signal, and then outputs the demodulated broadcast signal.

A broadcast signal decoding unit 210 decodes the demodulated broadcast signal into broadcast data, separates the decoded signal into a broadcast object and image reproduction control information (e.g., scene change control information, interval change information, etc) for the broadcast object, and then outputs the broadcast object and the image reproduction control information. In this example, the broadcast object is image information (which can include text information) carried by the broadcast signal.

A memory unit 220 stores the broadcast data outputted by the broadcast signal decoding unit 210. The memory unit 220 includes an image reproduction control information storing unit (or broadcast object reproduction control information storing unit) 221, and an image buffer unit (or broadcast object buffer unit) 222.

The image reproduction control information storing unit 221 stores the image reproduction control information (e.g., image modification control information) for the broadcast object, which is decoded and outputted by the broadcast signal decoding unit 210. According to the embodiment of the present invention, the image scene change control information and reproduction dimension information for the image can be stored in the storage unit 221.

The image buffering unit 222 stores the image information (broadcast object) outputted from the broadcast signal decoding unit 210. And, the image buffering unit 222 can include a plurality of buffers capable of storing images, respectively.

An image transition processing unit (or broadcast object transition processing unit) 240 varies a scene or aspect of the image (broadcast object) stored in the image buffering unit 222 to be displayed, based on the image modification control information (e.g., scene change control information or interval change information). For instance, one or more of a form, a color, a motion, a brightness, an opacity, a dimension, and other features of the image to be displayed is modified based on the image modification control information stored in the storing unit 221.

Particularly, the image transition processing unit 240 operates an image transition effect table (or broadcast object transition effect table) 241. The image transition effect table 241 can be considered a lookup table and can contain specific information on how the image should be modified depending on the image modification control information. The information stored in the table 241, which corresponds to the specific image modification control information for the current broadcast object, can be utilized by the processing unit 240 to transform the image. The table 241 can also be considered as application software corresponding to the scene change control information (or interval change information) of the image, and can be frequently updated by the received broadcast data.

Once the image transition processing unit 240 modifies the image by using the image transition effect table 241 based on the corresponding image modification control information, it outputs the modified image to a display unit 280 and/or a switching panel unit 281.

A control unit 230 generates signals to control the components of the broadcast signal receiving apparatus, respectively. In another example, the image transition processing unit 240 and the control unit 230 may be combined into one element.

The display unit 280 receives the transformed image from the image transition processing unit 240 and then displays the received image. In particular, in case of displaying a 3-dimensional image using binocular disparity, the broadcast signal receiving apparatus is able to include the switching panel unit 281, e.g., preferably provided to a surface of the display unit 280 for the 3-dimensional image. In this case, the switching panel unit 281 is not operated if an image to be reproduced is in a 2-dimensional reproduction mode. If an image to be reproduced is in a 3-dimensional reproduction mode, the switching panel unit 281 is operated to configure a cubic effect for the image.

The apparatus of FIG. 5A can be, but is not limited to, a TV including a display unit such as LCD, projector, PDP, etc.

Figure 5B:
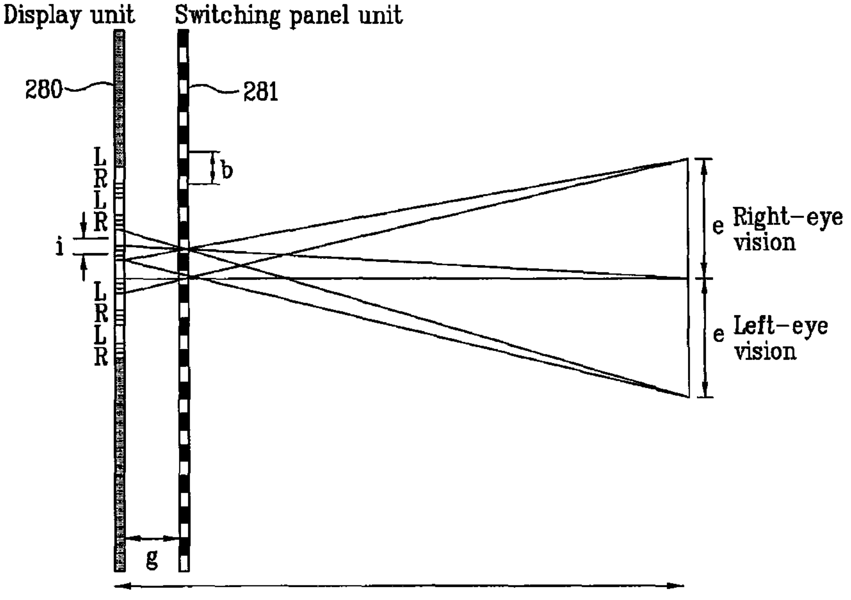
FIG. 5B is a diagram to explain a drive principle of a switching panel unit displaying a 3-dimensional image according to the present invention.

FIG. 5B is a diagram to explain a drive principle of the switching panel unit 281 for displaying a 3-dimensional image according to the present invention.

Referring to FIG. 5B, the switching panel unit 281 is an auto-stereoscopic barrier and is arranged in front of the display unit 280.

Images including a plurality of stereo pairs of left and right images L and R are divided into a plurality of vertical strips. In particular, the strips of a left image and the strips of a right image are alternately arranged on pixels (i), respectively.

In the switching panel unit 281, a plurality of slots are formed to be spaced apart from each other with a barrier interval (b). In particular, a plurality of the slots are arranged to enable a left eye of an observer to see the strips of the left image and a right eye of the observer to see the strips of the right image only. So, the observer or viewer is able to reconfigures an overall image into a 3-dimensional image and recognize the 3-dimensional image.

Binocular disparity, which means a visual difference between the right and left eyes in observing a subject, enables an image to be 3-dimensionally seen. If the image seen by the right eye and the image seen by the left are synthesized together, a stereoscopic (3-dimensional) image can be provided. So, by preparing a right eye image and a left eye image for one image and synthesizing the two images per pixel unit, an observer is able to see a stereoscopic image.

Yet, in case of synthesizing the two images, the switching panel unit 281 can be provided to the surface of the image display unit 280 in a manner that the eyesight of the right eye corresponds to the pixel indicating the right image and that the eyesight of the left eye corresponds to the pixel indicating the left image.

And, the switching panel unit 281 is driven to enable the synthesized image to be viewed by the eye sights to be seen if the scene change control information for an image obtained from the received broadcast data is dimension information for a stereoscopic configuration.

Moreover, the switching panel unit 281 is made not to be driven if the scene change control information for the image obtained from the received broadcast data is dimension information for 2-dimensions. As a result, the switching panel unit 281 enables a normal 2-dimensional image to be reproduced as it is by the display unit 280.

FIG. 6 is an example of an image transition effect table, which can be referred to be based on scene change control information according to an embodiment of the present invention. This table can be an example of the table 241 in FIG. 5A.

Referring to FIG. 6, image modification control information such as scene change control information for an image obtained from the broadcast data is provided as control information to change a form, a color, a brightness, an opacity, a motion, a dimension and the like of the transmitted image or broadcast object. And, the broadcast signal receiving apparatus operates a transition effect table of a corresponding image to perform a scene change.

For example, if the scene change control information received by the broadcast signal receiving apparatus has a decimal number “10” (which can be stored in the area (a) in FIG. 2 or in the field 12 in FIG. 1), then the image transition processing unit 240 looks up the transition effect table 241 (e.g., the table in FIG. 6), recognizes that the decimal number “10” means the corresponding broadcast object should have a ‘spiral out’ effect and modifies the broadcast object to implement the ‘spiral out’ effect.

In another example, if the received image modification control information for an image pertains to modifying a motion of the image, the broadcast signal receiving apparatus either changes a scene of the image by varying a position of an observer sight line for a transferred image (like a motion of camera) or changes the scene into a scene wherein a position of the image is moved in all directions (upward, downward, right and left). For instance, the motion of the image can be modified by changing a position of an observer of the image and/or a position of the image being displayed.

In another example, if the received image modification control information is interval changing information, then the receiving apparatus can change the intervals between adjacent images according to the interval changing information, which can vary a characteristic of the images being displayed and can be viewed as a special effect.

Scene transitions indicate a situation of changing one scene into another scene. And, a scene transition scheme indicates a smooth scene-to-scene connection or an extremely emphasized representation by varying the elements including the form, color, motion, sound and the like at the moment of switching the scene. Such transitions can also be implemented by the image transition processing unit 240 based on the received image reproduction/modification control information.

Preferably, the image transition effect table 241 according to the present invention is interoperable based on the image reproduction control information received as part of broadcast data. As an example only, the scene change control information of image can be computer software for executing a scene change of a broadcast signal image received by the broadcast signal receiving apparatus.

A method for processing a scene change of an image in the broadcast signal receiving apparatus according to an embodiment of the present invention includes the steps of selecting a meaningful detail scene, among the plural scenes, to deliver a series of events most effectively, which are suitable to maintain the intention of the broadcast signal transmitting end (e.g., broadcast station) and a situation context, and arranging the images in a specific sequence. In this case, the images carried by the broadcast signals can be obtained from photographing or computer graphics.

In the related art broadcast signal reproducing method, a receiver receives a broadcast signal as pre-processed and transformed images, (i.e., video data already transformed using image scene transitions and special effect processing side is received by the receiver at the receiving side), and then reproduces the received signal as it is. Clearly, such related art method is different from the broadcast signal reproducing method according to the present invention in many different aspects.

For instance, the present invention provides the broadcast signal (or image) reproducing method wherein a post-processing of any scene change or other alteration of an image (or an interval between the images) is carried out by a receiving end according to the reproduction control information for the image received together with the image data as broadcast data. For instance, in scene transitions that a receiving end changes one image into a next image based on image reproduction control information, time and space shifts are represented and the image is reproduced by varying one or more of a style, a tone, a rhythm and the like according to a flow of image connection.

Scene change control information of an image (or other broadcast object) according to the present invention is able to bring a transition effect such as fade-in, fade-out, dissolve, wipe, spiral-in, spiral-out, etc. In case of a scene transition of an image is desired, by varying one or more of the following: an image form, an image color, an image brightness, an image opacity, an observer's position, an image position, an image dimension and others associated with the image.

Figure 7A:
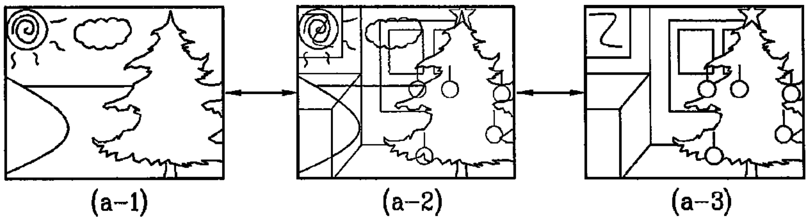
FIG. 7A is an exemplary diagram showing a dissolve transition effect of an image displayable by using image modification control information according to one embodiment of the present invention.

FIG. 7A is an exemplary diagram illustrating an example of a dissolve transition effect implemented by using image scene change control information according to one embodiment of the present invention.

Referring to FIG. 7A, if the broadcasting signal receiving apparatus determines that the received scene change control information for an image corresponds to a dissolve action type based on an image transition effect table, an image processing unit (e.g., the image transition processing unit 240) of the receiving apparatus end performs an image processing to switch an image to a next image slowly by mixing the latter image with the former image. The dissolve as a technique of scene transitions connects continuity and association of image contents. In particular, a subjective relation of contents or a structural relation is represented. The subjective relation may indicate a case that a scene of a street crowded with people is dissolved into a scene of crowding cows. And, the structural relation may indicate a case that, e.g., a scene of an outfielder jumping to catch a baseball is dissolved into a scene of a leaping dancer.

Generally, a technique of gradual scene transitions between shots of two images temporarily overlapped with each other is called a dissolve. In particular, the dissolve can be used in showing a relation between a past event and a subsequent event. For instance, a scene of a child running to play around a home field is shortly dissolved into a professor lecturing a babyhood behavior having influence on adulthood. And, the dissolve represents or emphasizes a rhythm of event.

The exemplary diagram shown in FIG. 7A represents a match dissolve indicating a dissolve skill (technique) between scenes having similar contents or types. The image change sequence of '(a−1)→(a−3)' indicates the time and space passage of the images in a manner of dissolving a pine tree in the woods into a decorated pine tree in a living room.

Besides, there exists other types of scene change control information such as 'shimmer dissolve', 'dissolve lapse' and the like, which can be used in the present invention. In the 'shimmer dissolve', an image appears like waves to signify a scene as reminiscence of the past. And, the 'dissolve lapse' dissolves actions occurring in the same place to show continuity of a series of actions indicating a building construction process or a change of seasons.

Figure 7B:
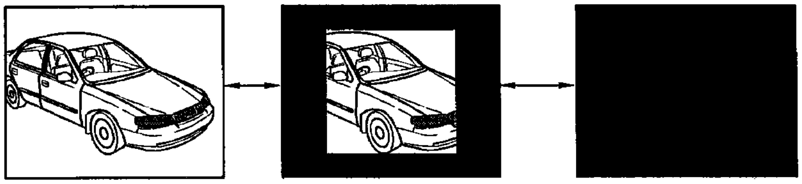
FIG. 7B is an exemplary diagram showing a fade-in/out transition effect of an image displayable by using image modification control information according to another embodiment of the present invention.

FIG. 7B is an exemplary diagram illustrating an example of a fade-in/out transition effect implemented by using image scene change control information according to the present invention.

Referring to FIG. 7B, if the broadcasting signal receiving apparatus determines that the received, scene change control information for and image corresponds to a fade action type based on an image transition effect table, the image processing unit of the receiving apparatus makes the received image get dimmer gradually [(b−1)→(b−3)] or brighter gradually [(b−3)]→(b−1)]. In case that the scene change information is or corresponds to a 'fade-out', the exemplary diagram shown in FIG. 7B represents a function of ending a scene wherein an image of a car gets darker as the image is changed in the order of [(b−1)→(b−3)]. On the other hand, in case that the scene changes information is or corresponds to a 'fade-in', the exemplary diagram shown in FIG. 7B represents a function of ending a scene wherein an image of a car gets brighter as the image is changed in the order of [(b−3)→(b−1)].

Figure 7C:
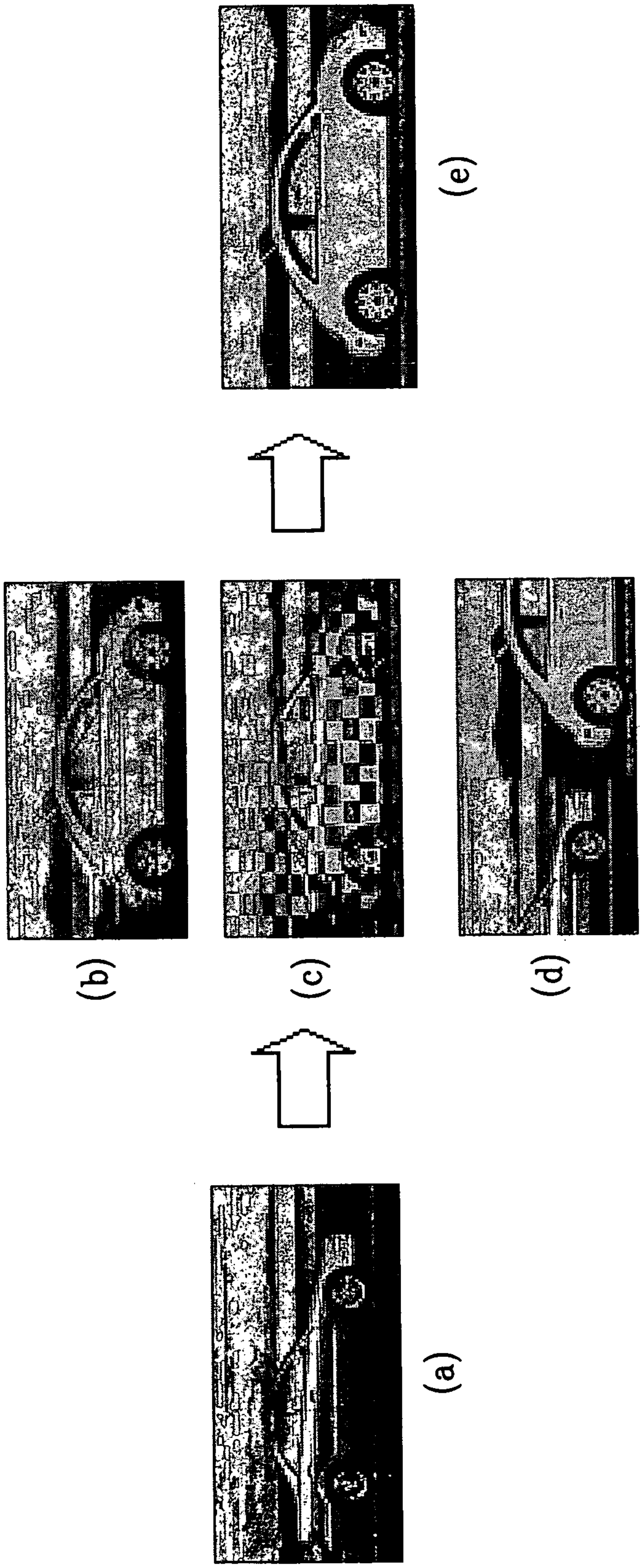
FIG. 7C is an exemplary diagram showing an image transition effect of an image displayable by using image modification control information according to another embodiment of the present invention.

FIG. 7C is an exemplary diagram for illustrating an example of an image transition effect implemented by using image scene change control information according to the present invention.

Referring to FIG. 7C, in a scene transition method of two images using an image transition effect table (e.g., table 241) corresponding to scene change control information of the present invention, a scene transition is processed in the sequence of '(a)→(b)→(e)' according to the scene change control information for adjusting opacity, by making a first image (a) get transparent gradually in increasing opacity of a second image (b) next to the first image (a) while the first image (a) is overlapped with a last image (e).

In the scene transition method of two images using the image transition effect table corresponding to the scene change control information according to an embodiment of the present invention, the first image (a) is switched to the last image (e) in the sequence of '(a)→(c)→(e)' in FIG. 7C according to the scene change control information (indicating a dissolve action) for connecting the detailed parts of the images smoothly. The dissolve action carries out effects of two images simultaneously to synthesize the images, wherein an image prior to the 'fade-out' disappears as soon as a next image of the 'fade-in' appears. This is different from an overlapping method of synthesizing the two same images. The overlapping method is dedicated to an image overlapping so that two images are fixed as synthesized, whereas the dissolve method is basically changes two images into one image based on fade-in/fade-out.

In the scene transition method of two images using the transition effect table corresponding to the scene change control information according to an embodiment of the present invention, the sequence of '(a)÷(d)→(e)' in FIG. 7C corresponds to an example of scene transitions processed by the scene change control information for moving a motion of the image in the left-to-right or right-to-left direction in case of a scene transition is applied to the last image (e) from the first image (a). The motion direction of the image preferably means a line or proceeding path on which an image moves. Ascent or descent of the image (top→bottom, bottom→top) or advance or retreat of the image establishes an intentional perceptive path enabling eye motion to proceed along a previously planned process. A directional force working within the image may be able to induce a line of sight from one point to another.

According to an embodiment, other effects such as a wipe transition effect, a special transition effect and the like can be provided by using scene change control information. For instance, the receiving apparatus performs an image transition using a corresponding image transition effect table stored therein based on the received scene change control information, image interval change information, or other type of image modification control information, and then reproduces the image. In this case, the wipe transition effect can be carried out in a manner that a new image pushes away an old image from one side to represent an elapse of time.

Figure 8:
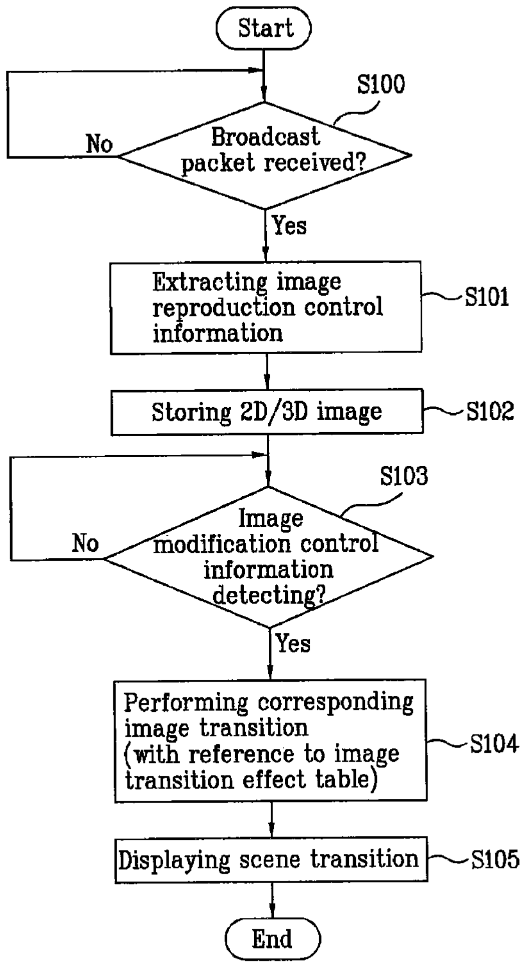
FIG. 8 is a flowchart of a method of reproducing a broadcast signal in an apparatus for receiving the broadcast signal including image modification control information according to an embodiment of the present invention.

FIG. 8 is a flowchart of a method of reproducing a broadcast signal in an apparatus for receiving the broadcast signal including reproduction control information (e.g., image scene change control information or image interval change information) according to an embodiment of the present invention. This method can be implemented by the receiving apparatus of FIG. 5A or the terminal of FIG. 9. Also, this method is discussed below for an example where a broadcast object is an image. However, the method is equally applicable to other types of broadcast object.

Referring to FIG. 8, a broadcast signal packet including an image and reproduction control information for the image is received via a broadcasting network, e.g., from the broadcast signal transmitting apparatus of FIG. 4 (S100). The received broadcast signal packet can have the data structure of FIG. 1 or 2.

The image and the image reproduction control information are then extracted from the received broadcast signal (S101). The extracted image reproduction control information can be stored in the image reproduction control information storing unit 220 of the receiving apparatus of FIG. 5A.

Subsequently, a 2-dimensional or 3-dimensional image according to a reproduction mode of the received image is stored (S102). For instance, the image data obtained from the received broadcast signal is stored in the image buffer unit 22 of the receiving apparatus.

From the image reproduction control information, image modification control information (e.g., Scene change control information of the image and/or image interval change information for the image) is detected (S103).

A scene transition of the corresponding image is carried out based on an image transition effect table corresponding to the detected image modification control information (S104). For instance, if the scene change control information is detected, then the image transition processing unit 240 obtains the scene change control information, looks up the image transition effect table 241 for identifying a specific scene transition action or other action that corresponds to the scene change control information based on the scene change control information, and the implements the identified action to transform the image accordingly.

Finally, the changed image is displayed according to the scene transition or desired action (S105). For instance, the image transition processing unit 240 controls the display unit 280 and/or the switching panel unit 281 to display the image with the desired effect.

Figure 9:
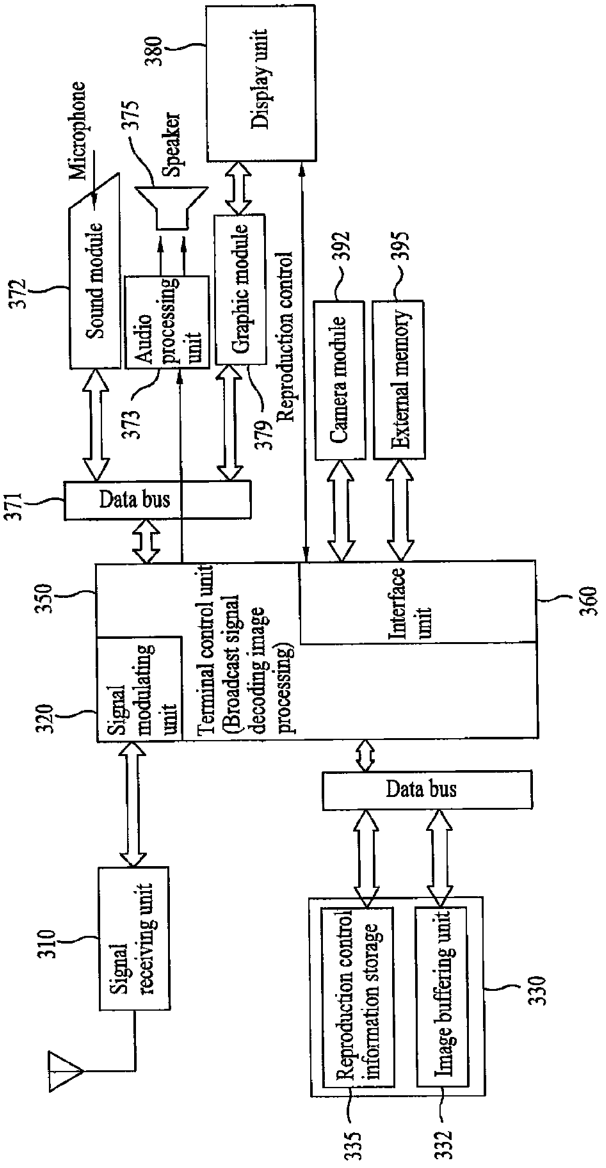
FIG. 9 is a block diagram of a mobile communication terminal according to an embodiment of the present invention.

FIG. 9 is a block diagram of a mobile communication terminal as part of or as an example of an image playing apparatus or broadcast signal receiving apparatus according to an embodiment of the present invention. All the components of the mobile communication terminal are operatively couled and configured.

Referring to FIG. 9, a signal receiving unit 310 receives a broadcast signal transmitted via a broadcasting network in the form of a transport stream (hereinafter abbreviated TS) packet. Hence, the TS packet can have the broadcast signal data structure of FIG. 1 or 2.

A signal modulating unit 320 decodes the TS packet of the received TS signal into data that can be processed by a terminal system.

A memory unit 330 stores various kinds of operational software of the mobile communication terminal overall and includes a reproduction control information storage 335 and an image buffering unit (or broadcast object buffering unit) 332.

In particular, the reproduction control information storage 335 obtains scene change control information and/or image interval change information for a received image from the received broadcast data and then stores the obtained information. The scene change control information matching a corresponding image can be read according to a page control signal. The image buffering unit 332 stores images of broadcast data in an image form of 2D, 3D, 2D-group, 3D-group or the like according to an image reproduction dimension. And, the image buffering unit 332 can include a plurality of buffers.

A control unit 350 controls a series of signal processing for receiving and reproducing broadcast signals. The control unit 350 performs a scene transition processing or other effect of an image by obtaining the received image (or broadcast object) and scene change control information (or interval changing information) for the image from the received broadcast signal according to the present invention.

If a user drives an application associated with a broadcast viewing or selects a function for a channel change or the like, an interface unit 360 generates corresponding command data. And, the interface unit 360 turns on/off broadcast service functions of the present invention or inputs a channel change, a broadcast signal reproducing signal and the like.

A data bus 371 is a data input/output path between multiple devices including the memory unit 330 and the control unit 350 or the like and decides a transport rate of data.

A sound module 372, in which various sound sources are loaded, adjusts a tone and volume of an audio signal inputted via a microphone.

An audio processing unit 373 processes an audio signal from the received broadcast data and then outputs the processed signal via a speaker 375.

A graphic module 379 represents scene transitions of an image according to the present invention in a manner that the pixels of a corresponding image correspond to a switching panel for a 2-dimensional or 3-dimensional image.

A display unit 380 receives a broadcast signal reproduction control signal from the control unit 350 and then represents the scene transition or the like of the changed image. In this case, if the reproduced image is a 3-dimensional image, the display unit 380 configures a cubic image by driving the switching panel unit.

A camera module 392 includes an external type camera connected to the mobile communication terminal to use and/or a built-in camera provided to a prescribed portion of the mobile communication terminal And, a built-in memory card module is providing to the mobile communication terminal to recognize a loading/unloading of an external memory 395. If the loading of the external memory is recognized, data is loaded from the external memory.

The mobile communication terminal as shown in FIG. 9 can be, but is not limited to, a mobile phone, a smart phone, a PDA, a PMP, a DMB terminal, etc. and can include other known components.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In a broadcast receiver configured to receive a broadcast data, a method of reproducing the broadcast data, comprising:

receiving, by the broadcast receiver, the broadcast data including an image group of images, an image transition effect table, and image reproduction control information from a broadcast transmitter, wherein the image reproduction control information comprises:

image scene change control information for arranging the images in a specific sequence, dimension information for the received image group, the dimension information indicating whether a reproduction dimension of the images in the image group is a 3-D reproduction dimension or a 2-D reproduction dimension, when the received image group is indicated as having a 3-D reproduction dimension, image information for each received image in the received image group, the image information indicating whether a corresponding image is a left image or a right image of a 3-D image, and additional information for modifying a form, a color, a brightness, an opacity, or a motion of the received images;

modifying, by the broadcast receiver, the received images based on the corresponding dimension information and the additional information;

storing the modified images in a 2-D form, a 3-D form, a 2-D group form, or a 3-D group form according to the image reproduction dimension;

arranging, by the broadcast receiver, the stored images in the specific sequence by using the image transition effect table and the image scene change control information; and outputting, by the broadcast receiver, the arranged images.

2. The method of claim 1, wherein the image scene change control information includes interval change information for changing intervals between the images.

3. The method of claim 1, wherein, when the dimension information indicates that the reproduction dimension of the received images is 2-D, the modified images are output as 2-D images.

4. An apparatus for reproducing broadcast data, comprising:

a receiving unit configured to receive the broadcast data including an image group of images, an image transition effect table, and image reproduction control information from a broadcast transmitter, wherein the image reproduction control information comprises:

image scene change control information for arranging the images in a specific sequence, dimension information for the received image group, the dimension information indicating whether a reproduction dimension of the images in the image group is a 3-D reproduction dimension or a 2-D reproduction dimension, when the received image group is indicated as having a 3-D reproduction dimension, image information for each received image in the received image group, the image information indicating whether a corresponding image is a left image or a right image of a 3-D image, and additional information for modifying a form, a color, a brightness, an opacity, or a motion of the received images;

a control unit configured to modify the received images based on the corresponding dimension information and the additional information, and to arrange the stored images in the specific sequence by using the image transition effect table and the image scene change control information;

a memory unit configured to store the image group and the image reproduction control information, wherein the memory unit stores the modified images in a 2-D form, a 3-D form, a 2-D group form, or a 3-D group form according to the image reproduction dimension; and a display unit configured to output the arranged images.

5. The apparatus of claim 4, wherein the image scene change control information includes interval change information for changing intervals between the received images.

6. The apparatus of claim 4, wherein, when the dimension information indicates that the reproduction dimension of the received images is 2-D, the modified images are output as 2-D images.

7. The apparatus of claim 5, wherein the control unit operates an image transition effect table corresponding to scene change control information included in the image reproduction control information.

8. The apparatus of claim 7, wherein the control unit updates the image transition effect table using the received broadcast data.

9. The apparatus of claim 6, further comprising:

a switching panel for performing a 3-D display or a 2-D display, wherein the switching panel is turned off if the dimension information indicates that the reproduction dimension of a received image is 2-D, and wherein the switching panel is turned on to disperse an incident angle if the dimension information indicates that the reproduction dimension of a received image is 3-D.

10. The apparatus of claim 4, wherein the apparatus is a TV or a mobile communication terminal.

11. The method of claim 1, wherein the image reproduction control information further includes:

information indicating a count of the received images included in the image group, information indicating a serial number of the received images included in the image group, information indicating a reproduction interval between a plurality of image groups, and information indicating a group serial number of the image group.

12. The apparatus of claim 4, wherein the image reproduction information further includes:

information indicating a count of the received images included in the image group, information indicating a serial number of the received images included in the image group, information indicating a reproduction interval between a plurality of image groups, and information indicating a group serial number of the image group.

* * * * *